US007068504B1

(12) United States Patent
Helgenberg et al.

(10) Patent No.: US 7,068,504 B1
(45) Date of Patent: Jun. 27, 2006

(54) METHOD AND APPARATUS FOR REDUCING COMPUTER AIR RECIRCULATION

(75) Inventors: John A. Helgenberg, Paoli, PA (US); Kenneth J. Neeld, West Chester, PA (US); Terry W. Louth, Narvon, PA (US)

(73) Assignee: Unisys Corporation, Blue Bell, PA (US)

( * ) Notice: Subject to any disclaimer, the term of this patent is extended or adjusted under 35 U.S.C. 154(b) by 283 days.

(21) Appl. No.: 10/727,756

(22) Filed: Dec. 3, 2003

(51) Int. Cl.
*G06F 1/16* (2006.01)
(52) U.S. Cl. ...................................... 361/687; 361/679
(58) Field of Classification Search ................ 361/679, 361/683–688, 690–695
See application file for complete search history.

(56) References Cited

U.S. PATENT DOCUMENTS 5,768,097 A * 6/1998 Jelinger ...................... 361/683
6,785,133 B1 * 8/2004 Barringer et al. ........... 361/694
6,829,141 B1 * 12/2004 Garnett et al. .............. 361/687

* cited by examiner

*Primary Examiner*—Yean-Hsi Chang
(74) *Attorney, Agent, or Firm*—Lisa A. Rode; Mark T. Starr; RatnerPrestia

(57) ABSTRACT

A computer system including a frame defining a plurality of cells is provided. Each of the cells is configured to receive a computer module through a respective opening adjacent the cell. The computer system also includes a computer module configured for insertion into a respective one of the cells through a respective one of the openings. The computer system also includes a cell cover substantially covering at least one other of the openings adjacent a cell not occupied by a computer module.

23 Claims, 5 Drawing Sheets

METHOD AND APPARATUS FOR REDUCING COMPUTER AIR RECIRCULATION

FIELD OF THE INVENTION

This invention relates to a computer system configured to reduce potential air recirculation, and more particularly, to a computer system having reduced or eliminated air recirculation paths.

BACKGROUND OF THE INVENTION

Electronic equipment such as computer systems often include cooling systems (e.g., fans) to ensure reliable operation. In many computer server systems, for example, computer servers are mounted in a cabinet frame that may be closed off on the sides by skins or adjacent cabinets. In such an arrangement, cooling gas (e.g., cooling air) may be brought into the front of the cabinet (e.g., using fans). The cooling gas passes through the area to be cooled, and is then desirably exhausted out of the cabinet rear (e.g., through louvered doors).

In some arrangements, there may be restrictions to the exhaust exit path of the air stream, for example, through the cabinet rear. In such situations, the now heated cooling gas may have the opportunity to re-circulate around to the front of the cabinet via certain paths. Such recirculated cooling gas may be pulled back through the computer system, thereby causing potential stress to heat sensitive components included in the computer system.

As such, it would be desirable to provide a computer system that substantially reduces or prevents potential cooling gas recirculation.

SUMMARY OF THE INVENTION

According to an exemplary embodiment of the present invention, a computer system including a frame defining a plurality of cells is provided. Each of the cells is configured to receive a computer module through a respective opening adjacent the cell. The computer system also includes a computer module configured for insertion into a respective one of the cells through a respective one of the openings. The computer system also includes a cell cover substantially covering at least one other of the openings adjacent a cell not occupied by a computer module.

According to another exemplary embodiment of the present invention, a computer system including a frame including a plurality of support members is provided. The support members at least partially define a plurality of cells in the frame. Each of the cells is configured to receive a respective computer module through a respective opening adjacent the cell. The computer system also includes a computer module configured for insertion into one of the cells through a respective one of the openings. A gap is defined between the computer module and at least one of the support members. The computer system also includes a gap cover substantially covering the gap.

According to yet another exemplary embodiment of the present invention, a method of preventing recirculation of cooling air in a computer system is provided. The computer system includes a frame defining a plurality of cells. Each of the cells is configured to receive a computer module through a respective opening adjacent the cell. The method includes inserting a computer module into one of the cells through a respective one of the openings. The method also includes covering, with a cell cover, another of the openings adjacent a cell not occupied with a computer module.

BRIEF DESCRIPTION OF THE DRAWINGS

Exemplary embodiments of the invention will be described with reference to the drawings, of which.

DETAILED DESCRIPTION OF THE INVENTION

Figure 1:
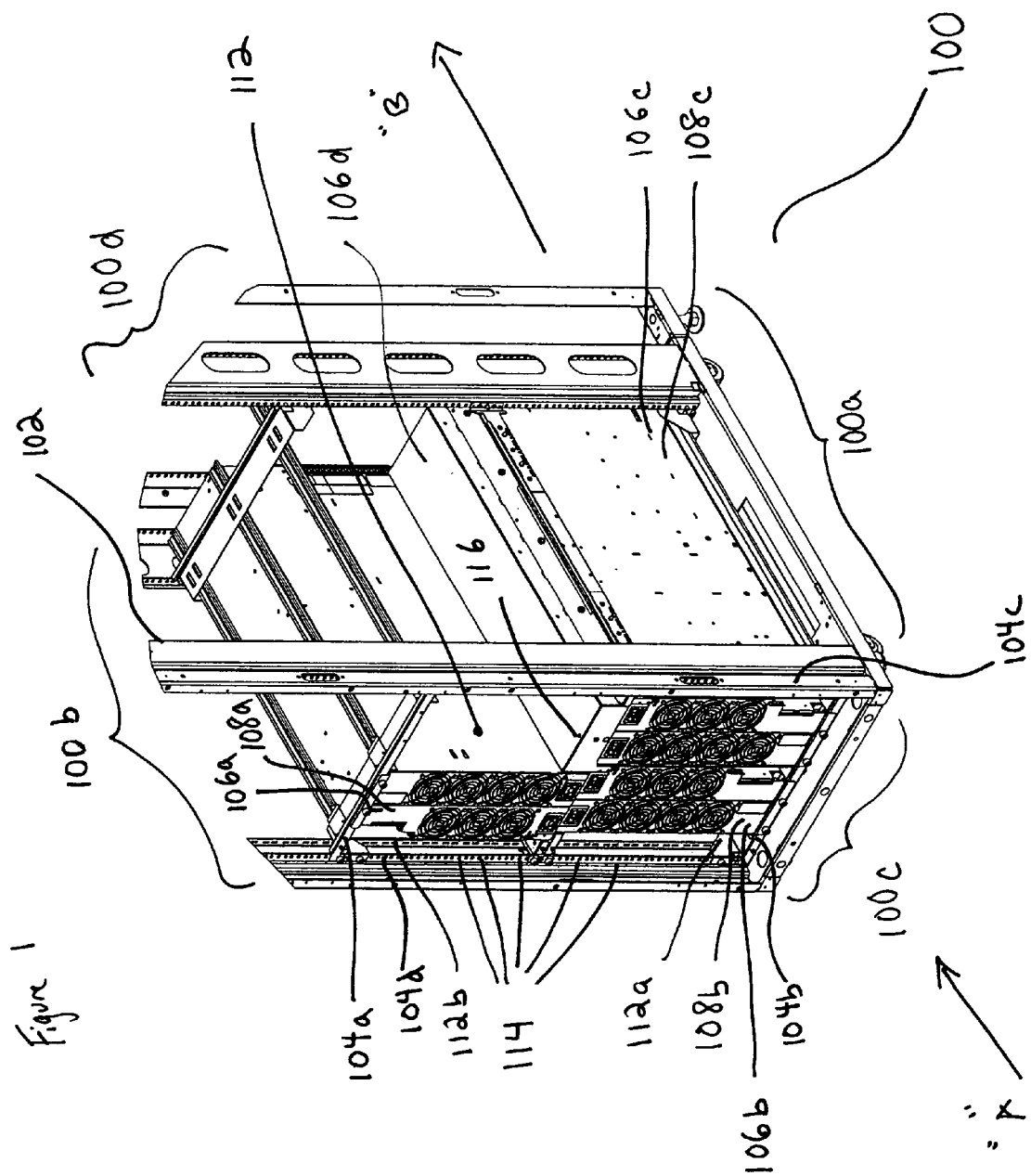
FIG. 1 is a front perspective view of a portion of a computer system in accordance with an exemplary embodiment of the present invention.

Preferred features of embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

This invention addresses problems related to the recirculation of cooling gas in electronic equipment such as computer server systems.

As used herein, the term computer system refers to a broad class of systems including computer components. For example, the computer system may be a computer server system including one or more computer servers mounted in a common cabinet or frame. The term computer module refers to any computer system component that may be included in the common cabinet or frame. Exemplary computer modules include memory devices, processor systems, input/output devices, cooling equipment, etc. In a computer server system, exemplary computer modules also include computer servers.

As used herein, the term frame refers to a broad class of structures configured for supporting any computer system. A frame may be integrally formed within a cabinet. Alternatively, a frame may be installed into a cabinet for supporting a computer system. Further still, the present invention applies to systems where the cabinet includes an integral frame, and an additional support structure (frame) for supporting the computer system is provided for coupling to the integral frame.

Referring to the Figures generally, computer system 100, including frame 102 defining cells 106a, 106b, 106c, and 106d, is provided. Each of cells 106a, 106b, 106c, and 106d is configured to receive a computer module (e.g., 108a, 108b, 108c) through a respective opening adjacent the cell. Computer system 100 also includes computer module (e.g., 108*a*, 108*b*, 108*c*) configured for insertion into a respective one of cells 106*a*, 106*b*, and 106*c* through a respective one of the openings. Computer system 100 also includes cell cover 120 substantially covering opening 112 adjacent cell 106*d* not occupied by a computer module.

According to another exemplary embodiment of the present invention, computer system 100, including frame 102 including a plurality of support members (e.g., 104*a*, 104*b*, 104*c*, and 104*d*), is provided. Support members (e.g., 104*a*, 104*b*, 104*c*, and 104*d*) at least partially define a plurality of cells 106*a*, 106*b*, 106*c*, and 106*d* in frame 102. Each of cells 106*a*, 106*b*, 106*c*, and 106*d* is configured to receive a respective computer module (e.g., 108*a*, 108*b*, 108*c*) through a respective opening adjacent the cell. Computer system 100 also includes computer module (e.g., 108*a*, 108*b*, 108*c*) configured for insertion into one of cells 106*a*, 106*b*, and 106*c* through a respective one of the openings. Gap (e.g., 112*a*, 112*b*) is defined between computer module (e.g., 108*a*, 108*b*) and at least one of support members (e.g., 104*a*, 104*b*, 104*c*, and 104*d*). Computer system 100 also includes gap cover (e.g., 122 and 124) substantially covering gap (e.g., 112*a*, 112*b*).

According to yet another exemplary embodiment of the present invention, a method of preventing recirculation of cooling gas in computer system 100 is provided. Computer system 100 includes frame 102 defining a plurality of cells 106*a*, 106*b*, 106*c*, and 106*d*. Each of cells 106*a*, 106*b*, 106*c*, and 106*d* is configured to receive a computer module (e.g., 108*a*, 108*b*, and 108*c*) through a respective opening adjacent the cell. The method includes inserting the computer module (e.g., 108*a*, 108*b*, and 108*c*) into one of cells (e.g., 106*a*, 106*b*, and 106*c*) through a respective one of the openings. The method also includes covering, with cell cover 120, opening 112 adjacent cell 106*d* not occupied with a computer module.

FIG. 1 is a front perspective view of a portion of computer system 100. Computer system 100 includes sides 100*a* and 100*b*, front 100*c*, and rear 100*d*. Sides 100*a* and 100*b* may be closed off using skins or an adjacent cabinet. In such an embodiment, cooling gas (e.g., cooling air) may be brought into computer system 100 in direction "A" towards front 100*c*. After passing through the area to be cooled, the now heated cooling gas may then be exhausted/vented from rear 100*d* in direction "B".

Certain obstructions in computer system 100 or other influences may prevent all of the heated cooling gas from properly exhausting from rear 100*d*. Further, if certain potential recirculation paths exist in computer system 100, recirculation of the heated cooling gas back to front 100*c* may be possible. As will be explained in greater detail below, FIG. 1 illustrated opening 112, gap 112*a*, gap 112*b*, and holes 114 as potential recirculation paths.

Computer system 100 illustrated in FIG. 1 includes frame 102. Frame 102 includes a number of support members, for example, support members 104*a*, 104*b*, 104*c*, and 104*d*. Frame 102 defines cells 106*a*, 106*b*, 106*c*, and 106*d*, each configured to receive a computer module.

The support members included in frame 102 can be configured for installation in any of a number of cabinet systems. For example, standard 19" cabinets may be used to house frame 102. Alternatively, frame 102 may be integrally formed in a cabinet.

In the exemplary embodiment of the present invention illustrated in FIG. 1, cells 106*a*, 106*b*, and 106*c* each hold a respective computer module 108*a*, 108*b*, and 108*c*.

The computer modules received by cells 106*a*, 106*b*, and 106*c* may be any of a number of computer modules, for example, memory storage, processor assemblies, input/output devices, etc. In the exemplary embodiment of the present invention illustrated in FIG. 1, for example, computer system 100 is a computer server system, and each of computer modules 108*a*, 108*b*, and 108*c* is a computer server included in the computer server system.

The exemplary computer system illustrated in FIG. 1 is a modular computer server system configured to receive four modular computer servers; however, in certain installations less than four computer servers (i.e., computer modules) may be installed. Such an arrangement is shown in FIG. 1, where cell 106*d* does not hold a computer module/computer server. In this arrangement, a path for potential recirculation of cooling gas may be provided through opening 112.

Additionally, although cells 106*a*, 106*b*, and 106*c* each hold a respective computer module as shown in FIG. 1, potential for air recirculation still exists adjacent the computer module. This is because there are still openings or gaps through which air can recirculate into the computer system. For example, gap 112*a* is defined between computer module 108*b* and support member 104*d*. Additionally, gap 112*b* is defined between computer module 108*a* and support member 104*d*. Further still, holes or openings (e.g., mounting holes) are defined by certain support members of frame 102. For example, holes 114 are defined by support member 104*d*. These holes are another potential path for air recirculation in computer system 100.

Figure 2:
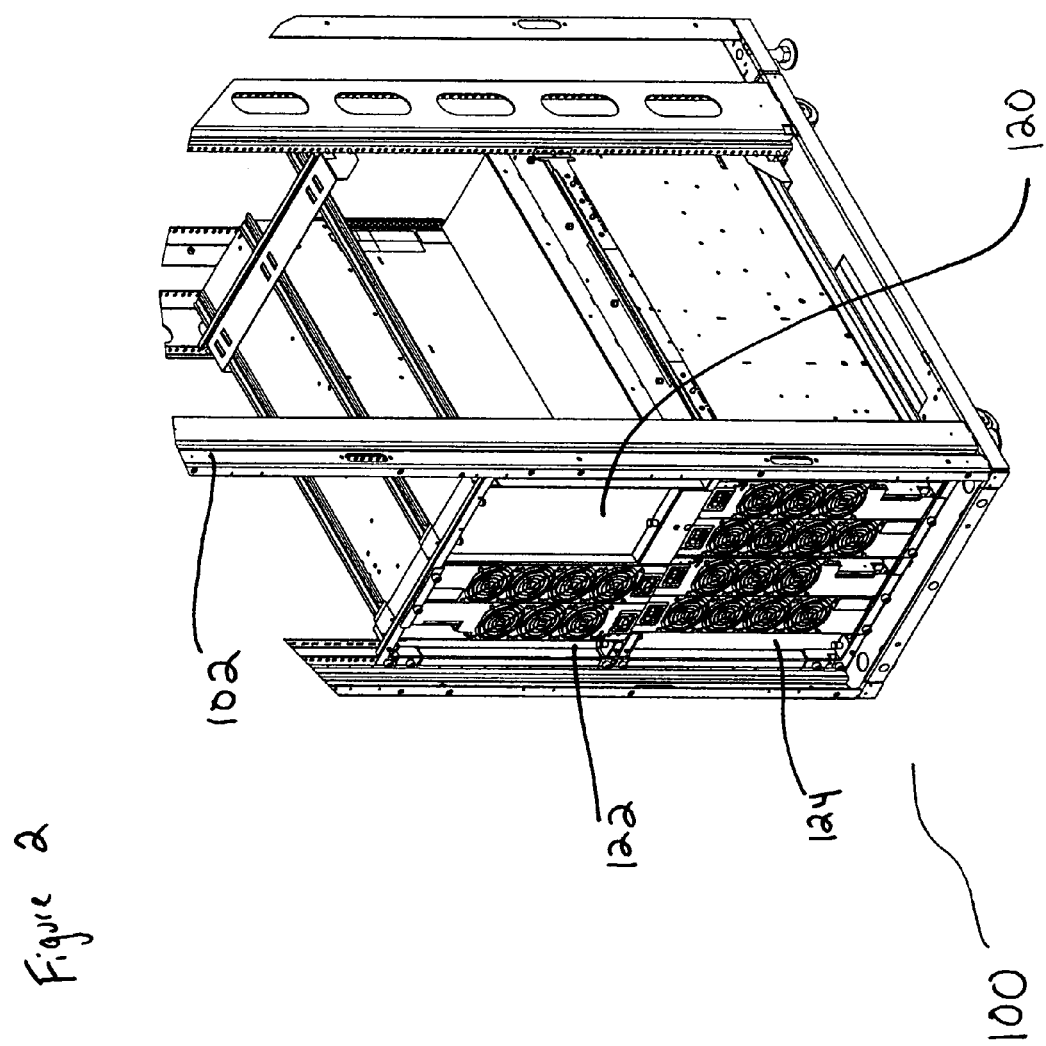
FIG. 2 is a front perspective view of a portion of the computer system of FIG. 1 modified in accordance with an exemplary embodiment of the present invention.

FIG. 2 is a front perspective view of a portion of computer system 100; however, computer system 100 shown in FIG. 2 has been modified in accordance with various exemplary embodiments of the present invention, as explained below.

Cell cover 120 is provided over opening 112 (not shown in FIG. 2), gap cover 122 is provided over gap 112*b*, and gap cover 124 is provided over gap 112*a*. By substantially closing off opening 112 and gaps 112*a*–112*b*, potential for air recirculation of cooling gas in computer system 100 is substantially reduced.

Figure 3:
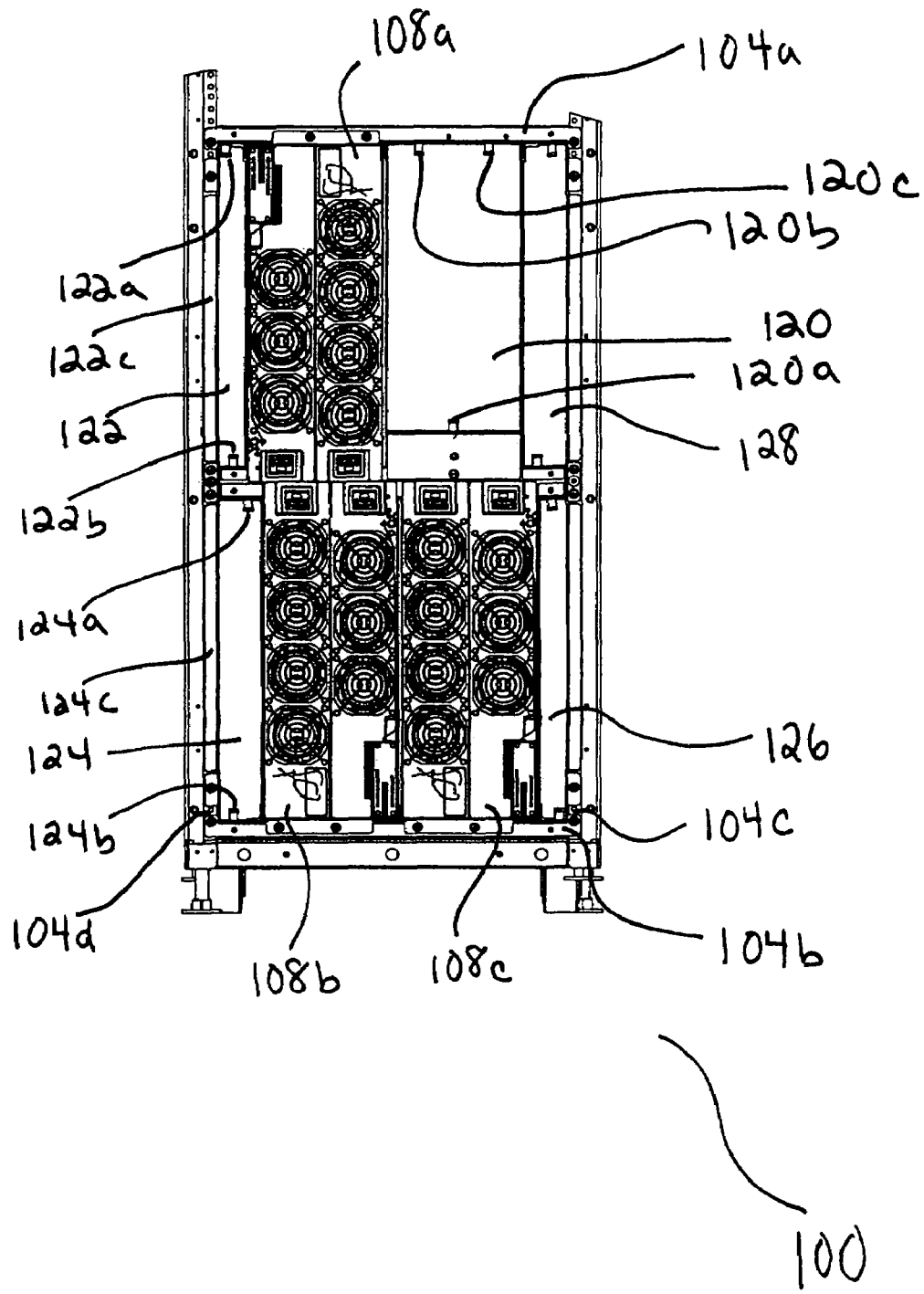
FIG. 3 is a front view of a portion of a computer system similar to the computer system illustrated in FIG. 2.

FIG. 3 is a front view of a portion of computer system 100 in accordance with an exemplary embodiment of the present invention. As with the exemplary embodiment shown in FIG. 2, FIG. 3 illustrates cell cover 120, gap cover 122, and gap cover 124. Additionally, FIG. 3 illustrates gap cover 126 and gap cover 128. Gap covers 126 and 128 are similar to gap covers 124 and 122 respectively, and as such, a detailed description of gap covers 126 and 128 is omitted.

As shown in FIG. 3, cell cover 120 includes fasteners 120*a*, 120*b*, and 120*c*. Likewise, gap cover 122 includes fasteners 122*a* and 122*b*, and gap cover 124 includes fasteners 124*a* and 124*b*. Fasteners 120*a*–120*c*, 122*a*–122*b*, and 124*a*–124*b* are configured to engage with holes defined in some portion of computer system 100. For example, as shown in FIG. 1, a portion of computer system 100 defines hole 116. Fastener 120*a* of cell cover 120 engages with hole 116 to at least partially secure cell cover 120 in the position shown in FIG. 3 such that potential for air recirculation within computer system 100 is substantially reduced.

Fasteners 120*a*–120*c*, 122*a*–122*b*, and 124*a*–124*b* may be any of a number of types of fasteners. For example, fasteners 120*a*–120*c*, 122*a*–122*b*, and 124*a*–124*b* may be spring-loaded retention pins. Spring-loaded retention pins can be of the pull and release type, and may be captive through a "twisting" operation. In such an embodiment, a user could pull the pin(s) in any of the covers, place the cover in the desired location over a potential path for air recirculation, and release the pin(s) such that the pin(s) engage with holes defined in a portion of the computer system. In such an embodiment, installation of the covers may be accomplished without any tools. Further, if the covers are designed such that the fasteners align with existing holes defined by the computer system/frame, modification of the computer system/frame (e.g., drilling) can be avoided.

As shown in FIG. 3, gap cover 122 includes flange 122c, and gap cover 124 includes flange 124c. Flanges 122c and 124c are provided to covers holes (e.g., holes 114 illustrated in FIG. 1), thereby further reducing potential for air recirculation in computer system 100.

Figure 4B:
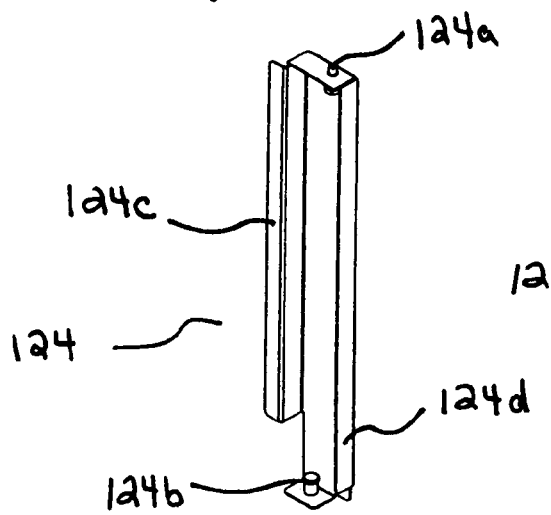
FIG. 4B is a front perspective view of a gap cover in accordance with an exemplary embodiment of the present invention.
Figure 4C:
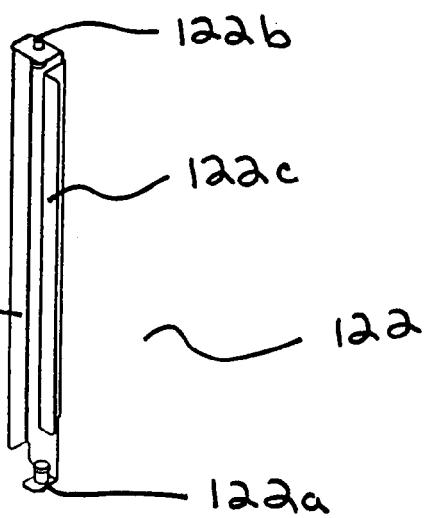
FIG. 4C is a front perspective view of another gap cover in accordance with an exemplary embodiment of the present invention.
Figure 4A:
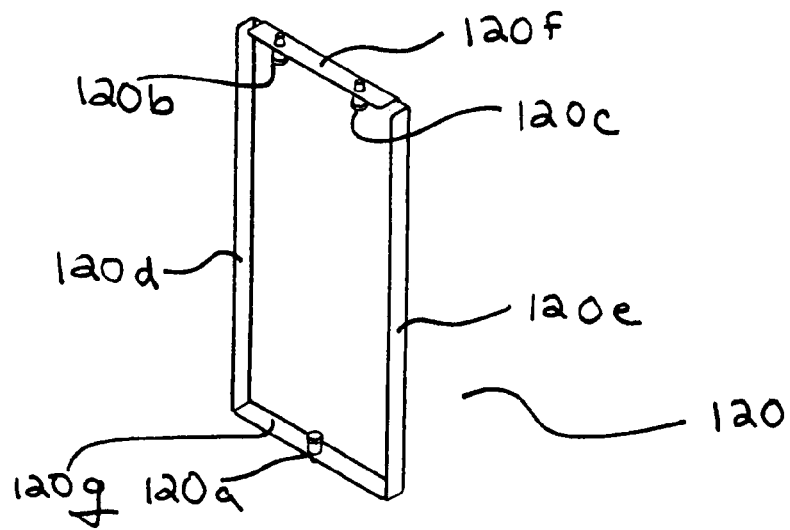
FIG. 4A is a front perspective view of a cell cover in accordance with an exemplary embodiment of the present invention.

FIG. 4A is a front perspective view of cell cover 120. Cell cover 120 includes fasteners 120a, 120b, and 120c. Further, cell cover 120 includes flanges 120d, 120e, 120f, and 120g. Flanges 120d, 120e may be provided to mate with a gap cover (e.g., gap cover 128 illustrated in FIG. 3), and/or a computer module (e.g., computer module 108a illustrated in FIG. 3). As shown in FIGS. 3–4, flanges 120f and 120g mate with another portion of computer system 100, for example, structural members included in computer system 100 (e.g., support member 104a illustrated in FIG. 3).

Because certain of flanges 120d, 120e, 120f, and 120g of cell cover 120 may mate against a portion of the structure of frame 102, rotation of cell cover 120 with respect to frame 102 may be substantially reduced or prevented.

FIG. 4B is a front perspective view of gap cover 124. Gap cover 124 includes fasteners 124a and 124b, as well as flanges 124c and 124d. As illustrated in FIGS. 1 and 3, flange 124c mates with support member 104d (i.e., flange 124c wraps around support member 104d) to cover mounting holes 114 (as shown in FIG. 1). Further, flange 124d may be provided to mate with computer module 108a shown in FIG. 3.

FIG. 4C is a front perspective view of gap cover 122. Gap cover 122 includes fasteners 122a and 122b, as well as flanges 122c and 122d. As described by reference to FIG. 3, flange 122c mates with support member 104d to cover mounting holes 114 (as shown in FIG. 1). Further, flange 122d may be provided to mate with computer module 108b shown in FIG. 3.

The covers disclosed herein (e.g., 120, 122, and 124) may be fabricated from any of a number of plastic or metallic materials, for example, sheet steel or aluminum. The material selected may also based upon other considerations such as grounding or shielding of computer system 100.

The covers disclosed herein (e.g., 120, 122, and 124) may be configured to attach to a supporting structure of a computer system, and not to a cabinet frame itself. As such, the covers disclosed herein (e.g., 120, 122, and 124) may be used in any of a variety of cabinet frame styles.

Figure 5:
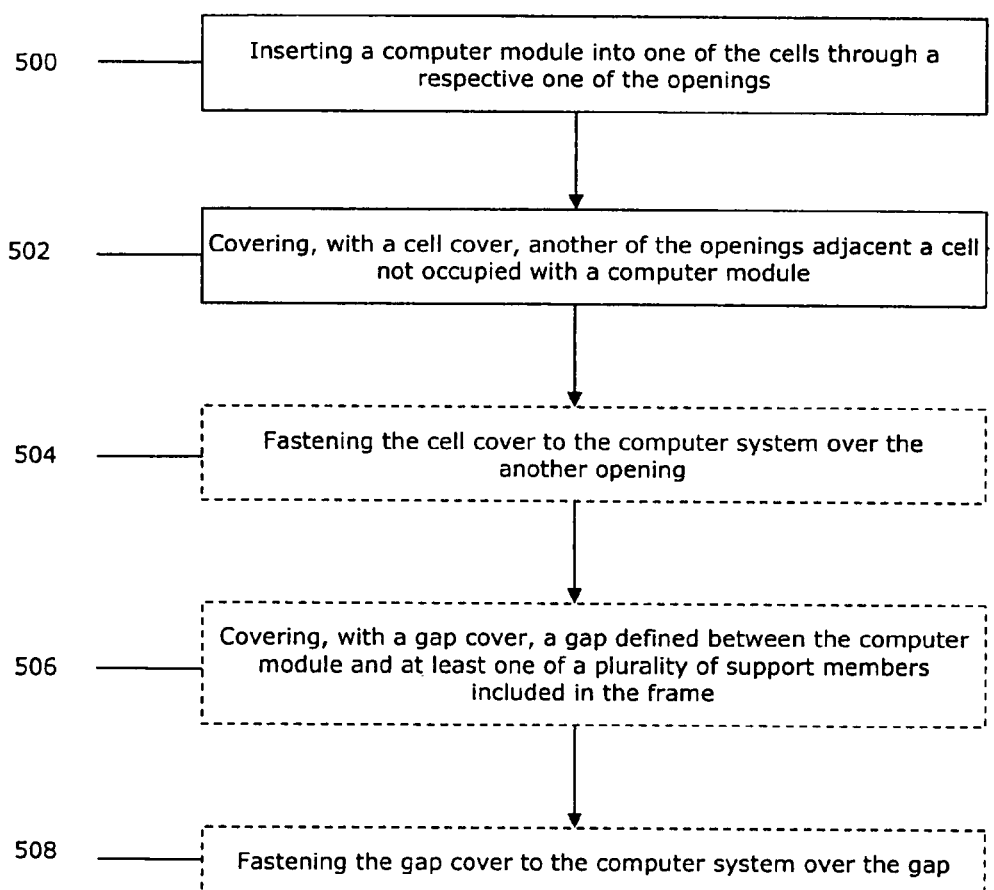
FIG. 5 is a flow diagram illustrating a method of preventing recirculation of cooling air in a computer system.

FIG. 5 is a flow diagram illustrating a method of preventing recirculation of cooling air in a computer system including a frame defining a plurality of cells. Each of the cells is configured to receive a computer module through a respective opening adjacent the cell. At step 500, a computer module is inserted into one of the cells through a respective one of the openings. At step 502, another of the openings adjacent a cell not occupied with a computer module is covered with a cell cover. At optional step 504, the cell cover is fastened to the computer system over the another opening. For example, step 504 may include engaging at least one spring-loaded retention pin coupled to the cell cover with a respective hole defined by the computer system. At optional step 506, a gap defined between the computer module and at least one of a plurality of support members included in the frame is covered by a gap cover. At optional step 508, the gap cover is fastened to the computer system over the gap. For example, step 508 may include engaging at least one spring-loaded retention pin coupled to the gap cover with a respective hole defined by the computer system.

Although the present invention has been primarily described in terms of computer server systems, it is not limited thereto. The present invention is applicable to any computer system or any electronic system where cooling is desired and cooling gas recirculation is a potential issue.

Although the present invention has been primarily described in terms of using spring-loaded retention pins for fastening the various covers to the computer system/frame, it is not limited thereto. While such fasteners may obviate the need for tools during installation, other fasteners are contemplated such as pins, screws, rivets, tongue/groove arrangements, sliding assemblies, and other known fasteners, etc.

Although the present invention has primarily been described in terms of distinctly shaped cover assemblies for covering respective potential recirculation paths, it is not limited thereto. Modifications to the size and shape of the covers may be made to close off any opening, in any electronic system, where air recirculation may be an issue.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A computer system comprising:
   a frame defining a plurality of cells, each of said cells being configured to receive a computer module through a respective opening adjacent each of said cells;
   said computer module configured for insertion into a respective one of said cells through said respective openings;
   a cell cover substantially covering at least one of said openings adjacent a cell not occupied by said computer module; and
   a gap cover substantially covering a gap defined between said computer module and at least one of a plurality of support members included in said frame, wherein said gap is not configured to receive said computer module,
   wherein said cell cover and said gap cover limit cooling gas used to cool a portion of the computer system from being recirculated into any of said plurality of cells.

2. The computer system of claim 1 wherein said computer module is oriented in said respective one of said cells such that cooling gas may be drawn into said cell through said respective opening for cooling said computer module.

3. The computer system of claim 1 wherein said cell cover includes at least one fastener configured for engagement with a respective hole defined by a portion of said computer system.

4. The computer system of claim 3 wherein said at least one fastener is a spring-loaded retention pin including an end portion configured for engagement with the respective hole defined by the portion of said computer system.

5. The computer system of claim 1 wherein said gap cover includes at least one gap cover fastener configured for engagement with a respective gap cover hole defined by another portion of said computer system.

6. The computer system of claim 5 wherein said at least one gap cover fastener is a spring-loaded retention pin including an end portion configured for engagement with the respective gap cover hole.

7. The computer system of claim 1 wherein said gap cover includes a flanged portion covering at least one mounting hole defined by said frame, said at least one mounting hole not being used for mounting.

8. The computer system of claim 1 wherein said computer system is a computer server system and said computer module is a modular computer server.

9. A computer system comprising:
- a frame including a plurality of support members, said support members at least partially defining a plurality of cells in said frame, each of said cells being configured to receive a respective computer module through a respective opening adjacent each cell;
- said computer module configured for insertion into one of said cells through a said openings, wherein a gap is defined between said computer module and at least one of said support members and said gap is not configured to receive said computer module; and
- a gap cover substantially covering said gap, wherein said gap cover is positioned over said gap such that cooling gas used to cool a portion of the computer system is limited from being recirculated into any of said plurality of cells.

10. The computer system of claim 9 wherein said computer module is oriented in said cell such that cooling gas may be drawn into said cell through said respective opening for cooling said computer module.

11. The computer system of claim 9 additionally comprising a cell cover substantially covering at least one openings adjacent a cell not occupied by a computer module.

12. The computer system of claim 11 wherein said cell cover limits cooling gas used to cool a portion of said computer system from being recirculated into any of said plurality of cells.

13. The computer system of claim 11 wherein said cell cover includes at least one fastener configured for engagement with a respective hole defined by a portion of said computer system.

14. The computer system of claim 13 wherein said at least one fastener is a spring-loaded retention pin including an end portion configured for engagement with the respective hole defined by the portion of said computer system.

15. The computer system of claim 9 wherein said gap cover includes at least one gap cover fastener configured for engagement with a respective gap cover hole defined by a portion of said computer system.

16. The computer system of claim 15 wherein said at least one gap cover fastener is a spring-loaded retention pin including an end portion configured for engagement with the respective gap cover hole.

17. The computer system of claim 9 wherein said gap cover includes a flanged portion covering at least one mounting hole defined by said frame.

18. The computer system of claim 9 wherein said computer system is a computer server system and said computer module is a modular computer server.

19. The computer system of claim 9 wherein said gap cover is positioned over apertures disposed on at least one of said support members.

20. A method of preventing recirculation of cooling gas in a computer system including a frame defining a plurality of cells, each of the cells being configured to receive a computer module through a respective opening adjacent each of said cells, said method comprising the steps of:
- inserting a computer module into one of the cells through a respective openings;
- covering, with a cell cover, another of the openings adjacent a cell not occupied with the computer module; and
- covering, with a gap cover, a gap defined between the computer module and at least one of a plurality of support members included in the frame, wherein the gap is not configured to receive a computer module.

21. The method of claim 20 additionally comprising:
fastening the cell cover to the computer system over the another opening.

22. The method of claim 21 wherein said fastening step includes engaging at least one spring-loaded retention pin coupled to the cell cover with a respective hole defined by the computer system.

23. The method of claim 20 additionally comprising the step of:
fastening the gap cover to the computer system over the gap.

* * * * *